(12) United States Patent
Chapman

(10) Patent No.: US 11,274,435 B2
(45) Date of Patent: Mar. 15, 2022

(54) BOLT CALIBRATED ANGLE MAINSTAY WALL CONNECTION SYSTEM AND METHOD FOR USE

(71) Applicant: Valmont Industries, Inc., Omaha, NE (US)

(72) Inventor: Brandon M. Chapman, Bourbon, IN (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 17/071,017

(22) Filed: Oct. 15, 2020

(65) Prior Publication Data

US 2021/0140171 A1 May 13, 2021

Related U.S. Application Data

(60) Provisional application No. 62/933,561, filed on Nov. 11, 2019.

(51) Int. Cl.
| | |
|---|---|
| *E04B 1/38* | (2006.01) |
| *E04B 1/58* | (2006.01) |
| *E04B 1/41* | (2006.01) |
| *E04H 12/10* | (2006.01) |

(52) U.S. Cl.
CPC .............. *E04B 1/5831* (2013.01); *E04B 1/40* (2013.01); *E04H 12/10* (2013.01); *E04B 2001/405* (2013.01); *E04B 2001/5875* (2013.01)

(58) Field of Classification Search
None
See application file for complete search history.

(56) References Cited

U.S. PATENT DOCUMENTS

| | | | | |
|---|---|---|---|---|
| 2,990,151 | A * | 6/1961 | Phillips | F16L 3/243 |
| | | | | 211/107 |
| 4,993,670 | A * | 2/1991 | Tesar | F16L 3/1091 |
| | | | | 248/68.1 |
| 5,118,060 | A * | 6/1992 | Spronken | E04F 13/0855 |
| | | | | 248/218.4 |
| 5,785,447 | A * | 7/1998 | Fonti | E04H 17/1413 |
| | | | | 403/49 |
| 6,209,832 | B1 * | 4/2001 | Yamazaki | G01C 15/006 |
| | | | | 248/219.4 |

(Continued)

*Primary Examiner* — Basil S Katcheves
(74) *Attorney, Agent, or Firm* — Milligan PC LLO

(57) ABSTRACT

The present invention provides a system which allows users to mount multiple pieces of equipment to a tower and it has the unique capability to adjust a steel frame to level without additional equipment. In accordance with a first preferred embodiment, the present invention includes a duel locking system that includes a taper adjusting bolt to adjustably position the frame level with the earth. According to still further aspects of the present invention, the present invention further includes attachable wall section elements which include at least upper and lower lateral spanning elements having first and securing weldments which preferably may integrally connect to the adjustable frame elements of the present invention. According to still further aspects of the present invention, the present invention preferably further includes upper and lower weldment connecting plates which are preferably connected to and extend from the upper and lower lateral spanning elements.

9 Claims, 10 Drawing Sheets

(56) References Cited

U.S. PATENT DOCUMENTS

| | | | | |
|---|---|---|---|---|
| 6,232,928 | B1* | 5/2001 | Zimmerman | H01Q 1/1242 |
| | | | | 343/882 |
| 6,406,008 | B1* | 6/2002 | Dudding | B60G 9/003 |
| | | | | 267/52 |
| 6,913,422 | B2* | 7/2005 | Rogers | E04G 7/307 |
| | | | | 248/219.4 |
| 7,213,376 | B2* | 5/2007 | Pulkkanen | E04B 1/4121 |
| | | | | 52/283 |
| 7,866,616 | B2* | 1/2011 | Wen | F16M 11/10 |
| | | | | 248/219.4 |
| 8,919,072 | B2* | 12/2014 | Han | E04B 1/34 |
| | | | | 52/699 |
| 9,869,108 | B2* | 1/2018 | Butler | E04H 12/2292 |
| 10,316,511 | B1* | 6/2019 | Chapman | F16B 7/00 |
| 2005/0284995 | A1* | 12/2005 | Hutter, III | B64C 1/406 |
| | | | | 248/235 |
| 2009/0152419 | A1* | 6/2009 | Wallace | A63B 63/004 |
| | | | | 248/219.4 |
| 2011/0083399 | A1* | 4/2011 | Lettkeman | H01Q 1/1228 |
| | | | | 52/745.21 |

* cited by examiner

BOLT CALIBRATED ANGLE MAINSTAY WALL CONNECTION SYSTEM AND METHOD FOR USE

RELATED APPLICATIONS

The present application claims priority to U.S. Provisional Application No. 62/933,561 filed Nov. 11, 2019.

FIELD AND BACKGROUND OF THE PRESENT INVENTION

Field of the Present Invention

The present invention is related in general to a tower construction system and, in particular, to a bolt calibrated angle mainstay wall connection system.

Background of the Invention

Installing and constructing a vertical tower frame involves a significant number of man hours. In particular, large amounts of man hours are required to properly taper vertical towers during construction while keeping horizontal tower elements level. This is because bending and adjusting the heavy, metal members of the tower is difficult and imprecise.

Current universal leg connection requires some form of an external force to physically move the frame to a desired taper. This external force can come from many devises (cranes, come-along, ropes and pulleys, or human exertion). These methods are bulky, expensive, and typically imprecise. Other designs use multiple holes to accomplish different tapers. These require precise measurements before installation and do not allow for a universal range of adjustment.

Still further, where properly tapered vertical towers can be constructed and maintained, there exists the additional problem of efficiently connecting lateral spanning elements and wall elements to the tapered tower elements. Still further, there are limitations which require the additional elements to match tower dimensions and be lightweight, easy to connect and add to the overall stability of the tower. Because of these reasons, tower elements are costly to install, restricted in size, and limited in variation and added benefits.

SUMMARY OF THE PRESENT INVENTION

To overcome the limitations of the prior art, the present invention provides a system and method which allows users to mount multiple pieces of equipment to a tower and it has the unique capability to adjust a steel frame to level without any additional equipment.

Further, the present invention provides a system and method which allows users to efficiently connect lateral spanning elements and wall elements to the tower structure. In accordance with a first preferred embodiment, the present invention includes a duel locking system that includes a taper adjusting bolt to adjustably position the frame level with the earth. Further, the dual locking system of the present invention preferably further includes the use of retaining bolts to keep the assembly positioned correctly.

According to a still further aspect of the present invention, once the taper adjusting bolt is in its desired position, the retaining bolts are preferably tightened to lock the frame in place. Finally, the taper adjusting bolt preferably acts as a redundant measure to help maintain the level state.

According to still further aspects of the present invention, the present invention preferably further includes attachable wall section elements which include at least upper and lower lateral spanning elements having first and second weldments which preferably may integrally connect to the adjustable frame elements of the present invention.

According to still further aspects of the present invention, the present invention preferably further includes upper and lower weldment connecting plates which preferably extend from the upper and lower lateral spanning elements.

One advantage of the present invention is that it allows the user to adjust or move a frame when loaded. Such adjustments are more precise because the added forces applied are the same forces that will be present when the installation is complete. Further, because of its unique screw-type adjustment design, the present invention further allows for an exact taper adjustment. Further, the present invention allows users to efficiently connect lateral spanning elements and wall elements to the tapered tower elements. Still further, the present invention provides lateral spanning elements which are lightweight, easy to connect and add to the overall stability of the tower.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DESCRIPTION OF THE PREFERRED EMBODIMENTS

Aspects of the present invention will be explained with reference to exemplary embodiments and examples which are illustrated in the accompanying drawings. These descriptions, embodiments and figures are not to be taken as limiting the scope of the claims. Further, the word "exemplary" is used herein to mean "serving as an example, instance, or illustration." Accordingly, any embodiment described herein as "exemplary" is not to be construed as preferred over other embodiments. Additionally, well-known elements of the embodiments will not be described in detail or will be omitted so as not to obscure relevant details.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Likewise, the term "embodiments" does not require that all embodiments of the invention include any discussed feature or advantage, nor that it does not incorporate aspects of the prior art which are sub-optimal or disadvantageous.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e. meaning "must"). Further, it should also be understood that throughout this disclosure, unless logically required to be otherwise, where a process or method is shown or described, the steps of the method may be performed in any order (i.e. repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
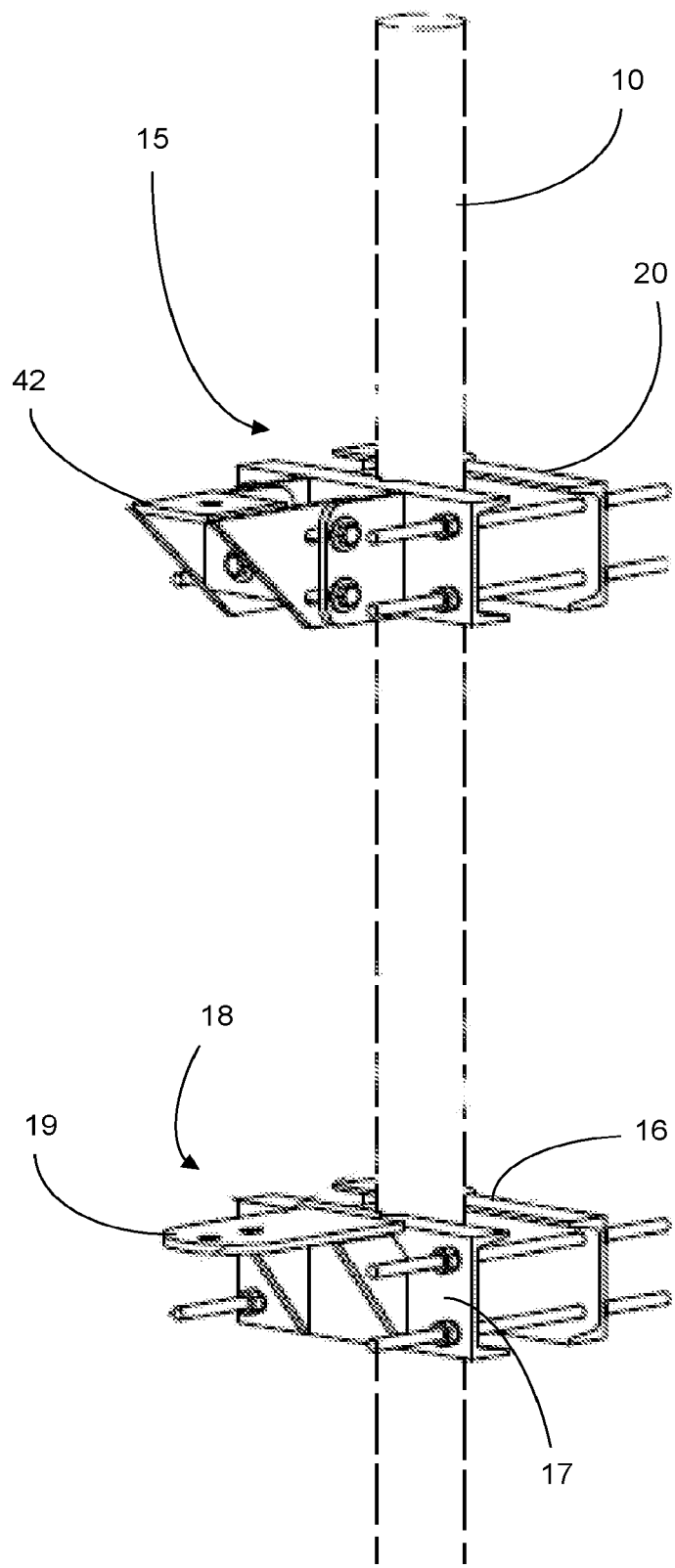
FIG. 1 illustrates a perspective view of a bolt calibrated angle mainstay in accordance with a first preferred embodiment of the present invention.

With reference now to FIG. 1, a first perspective view of a bolt calibrated angle mainstay in accordance with a first preferred embodiment of the present invention shall now be discussed. As shown in FIG. 1, the bolt calibrated angle mainstay of the present invention preferably includes an upper bracket element 15 and a lower bracket element 18 for securing to a common pole or beam 10. As further shown, the upper bracket element 15 as shown preferably further includes a straight slot weldment 42 and a securing back bracket 20.

Additionally, the lower bracket element 15 preferably includes a multi-hole taper plate weldment 19, a rear backing bracket 16 and a front plate 17.

Figure 2:
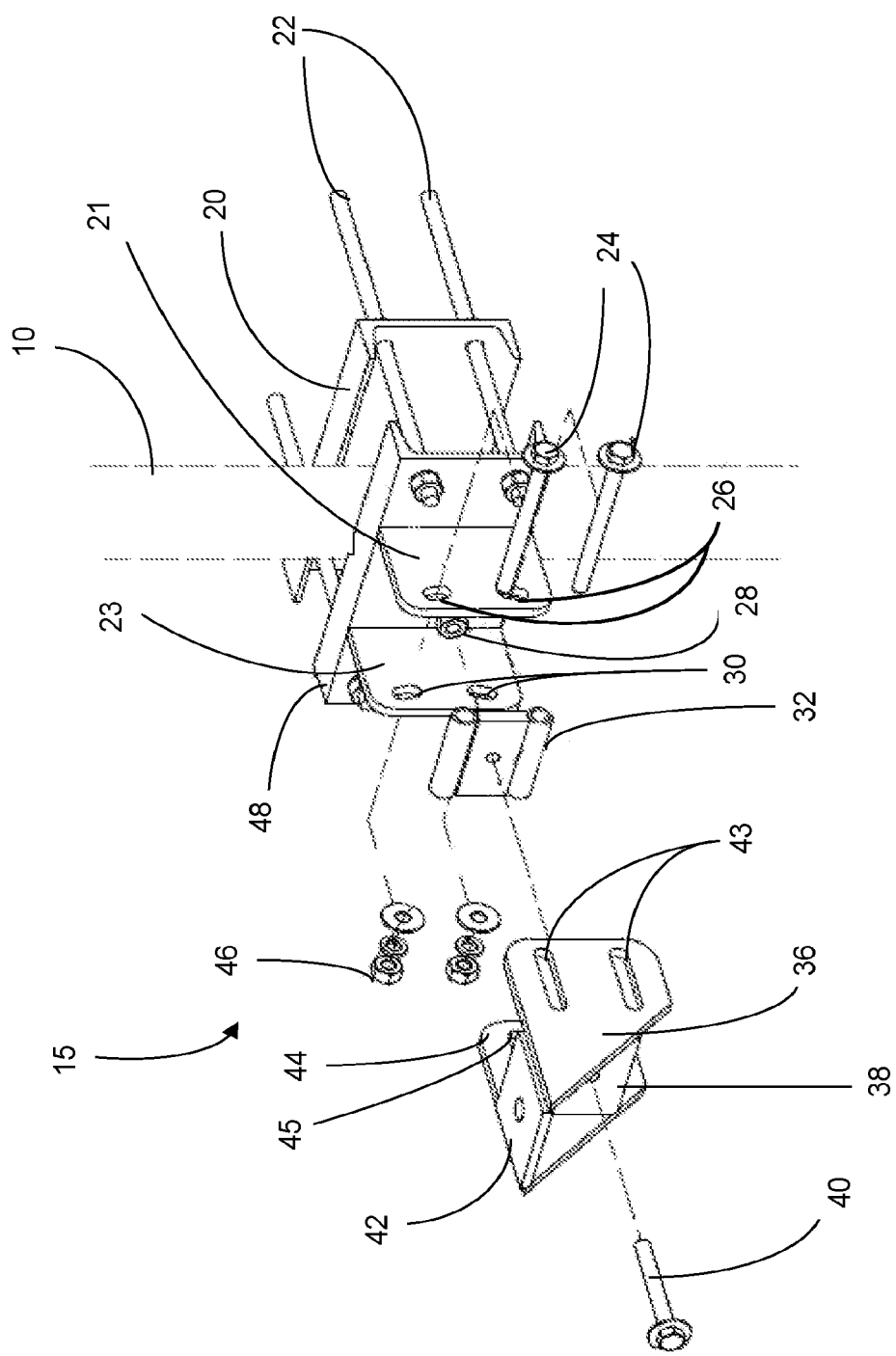
FIG. 2 illustrates an exploded view of an upper portion of the bolt calibrated angle mainstay shown in FIG. 1.

With reference now to FIG. 2, an exploded view of the upper bracket element 15 is provided. As shown, the upper bracket element 15 preferably includes a front plate 48 connected to a securing back bracket 20 via a plurality of connecting bolts 22 to secure to a pole 10. As further shown, the front plate 48 preferably further includes a right front wing 23 with a plurality of right wing slots 30 and a left front wing 21 with a plurality of left wing slots 26. The upper bracket element 15 further includes a straight slot weldment 42 which includes a right side element 44, a left side element 36 and a front section adjusting bolt guide 38. As used herein, the terms "slot", "bolt guide", "slotted hole" and "hole" are intended to refer to holes and/or other openings which allow securing devices (e.g. bolts) to extend therethrough without limitation.

As shown, the right and left side elements 36, 44 preferably include a plurality of slide slots 43, 45. According to a further preferred embodiment, the straight slot weldment 42 is designed to slide over a front positioning plate 32 and between the right front wing 30 and the left front wing 21. Preferably these pieces are made to align so that the retaining bolts 24 may extend sequentially through the left wing slots 26, the left wall slots 43, the positioning plate 32, the right wall slots 45 and the right wing slots 30 and secured with a securing element 46 (i.e. washers, nuts and the like). Finally, the upper bracket element 15 preferably includes an adjusting bolt 40 which extends sequentially through the adjusting bolt guide 38, the positioning plate 32 and into hex nut 28. According to a preferred aspect of the present invention, the adjusting bolt 40 is engaged and screwed into the hex nut 28 so that tightening the adjusting bolt 40 causes the straight slot weldment 42 to move along the retaining bolts 24 and change the distance between the straight slot weldment 42 and the front plate 48.

Figure 3:
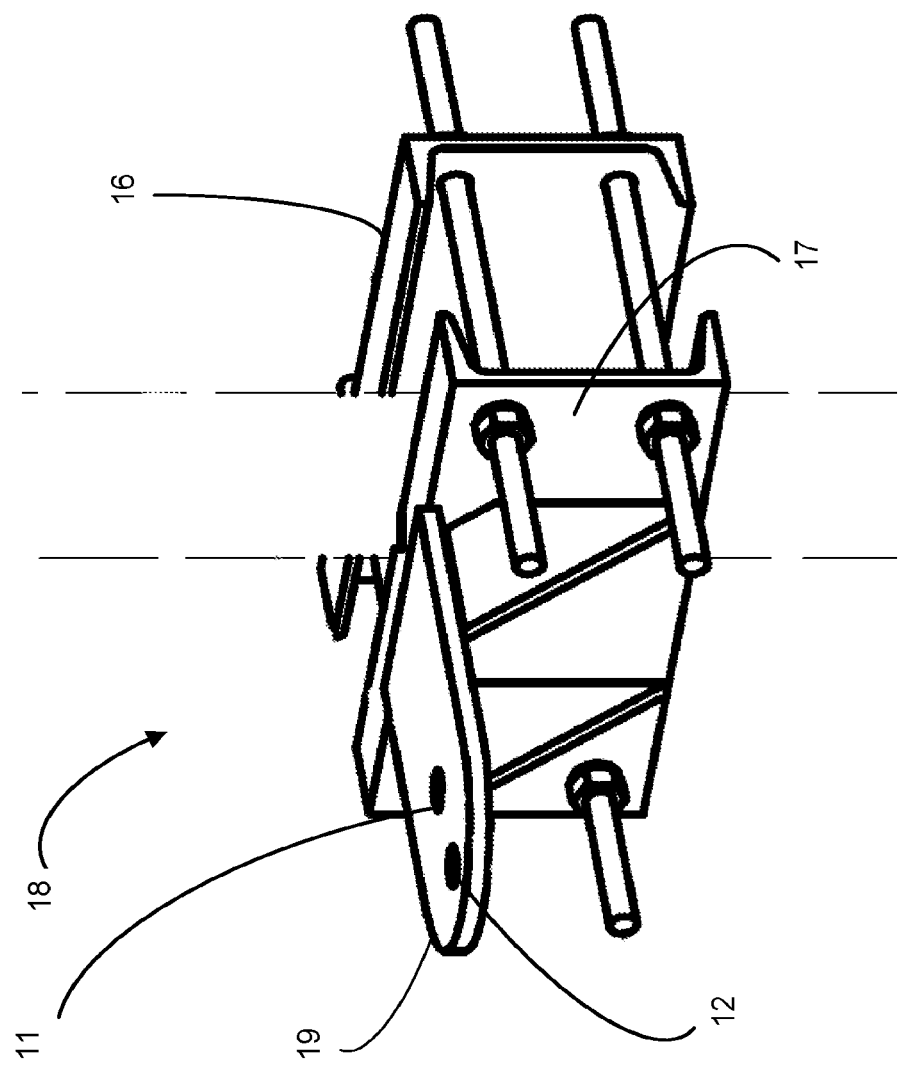
FIG. 3 illustrates a side perspective view of the lower portion of the bolt calibrated angle mainstay shown in FIG. 1.

With reference now to FIG. 3, the lower bracket element 18 shall now be further discussed. As shown in FIG. 3, the lower bracket element 18 preferably includes a backing bracket 16 which is connected to a front plate 17 and secured to a pole. Further, the lower bracket element 18 preferably includes a lower weldment 19 which may be formed as a multi-hole taper plate 19 which includes a higher angle taper hole 11 and lower angle taper hole 12.

Figure 5:
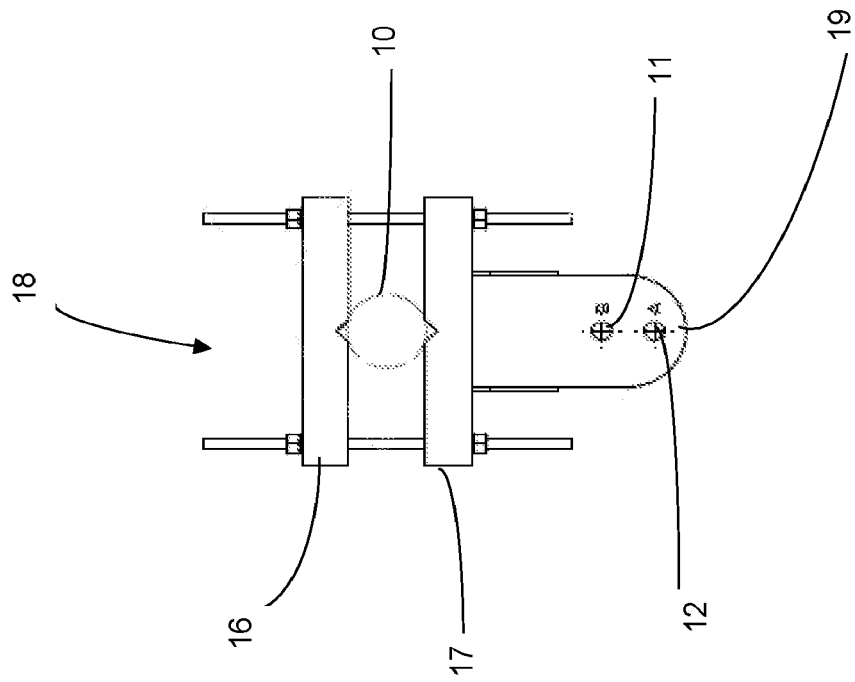
FIG. 5 illustrates a top-down view of the lower portion of the bolt calibrated angle mainstay shown in FIG. 1.
Figure 4:
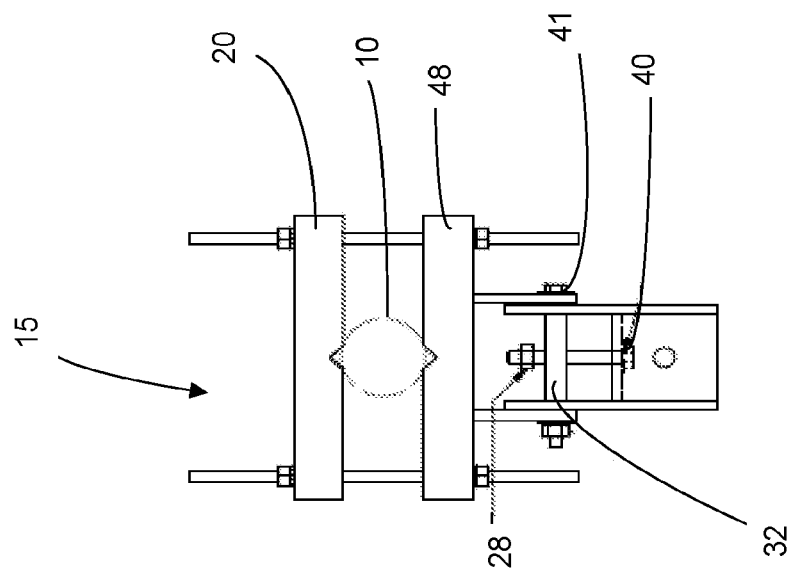
FIG. 4 illustrates a top-down view of the upper portion of the bolt calibrated angle mainstay shown in FIG. 1.

With reference now to FIGS. 4 and 5, a preferred method for use of the bolt calibrated angle mainstay of the present invention shall now be discussed. As shown in FIG. 4, the upper bracket element 15 is preferably installed by securing a pole 10 between the front plate 48 and a backing bracket 20. As shown in FIG. 5, the lower bracket element 18 is preferably secured to the pole 10 beneath the upper bracket element 15 via the lower front plate 17 and the lower backing plate 16.

Once installed, the angle of the bolt calibrated angle mainstay of the present invention is preferably calibrated/adjusted by first measuring the tower taper of the tower under construction. Depending on the angle of the taper, the user preferably selects either the low angle taper hole 12 (preferably between −2.5° and 2.5°) or a high angle taper hole 11 (preferably between 1.7° and 6°) on multi-hole taper plate weldment 19.

Thereafter, the user preferably turns the adjusting bolt 40 to adjust the frame to the desired taper and level. Finally, the user preferably torques the retaining bolts 41 (preferably to 75 lbs. or more) and advances the locking nut 28 to the front of the positioning plate 32. In accordance with a further preferred embodiment, once the taper adjusting bolt 40 is in its desired position, the retaining bolts 24 are preferably tightened to lock the frame in place, with the taper adjusting bolt 40 acting as a redundant measure to help maintain the level state.

Figure 6:
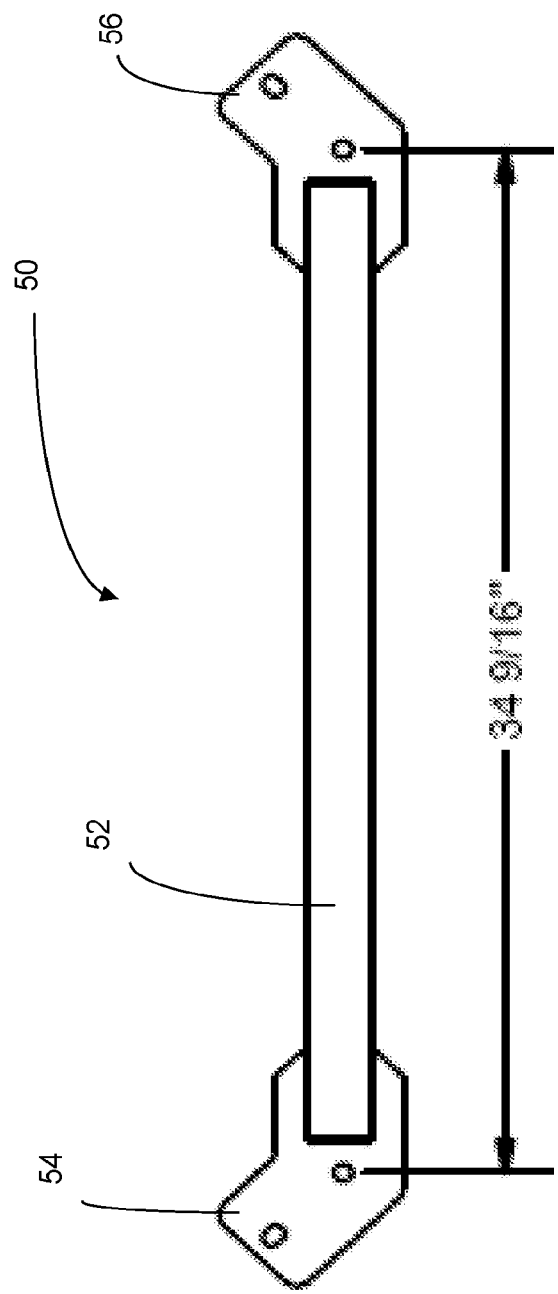
FIG. 6 illustrates a top-down view of a lateral spanning element in accordance with a preferred embodiment of the present invention.
Figure 7:
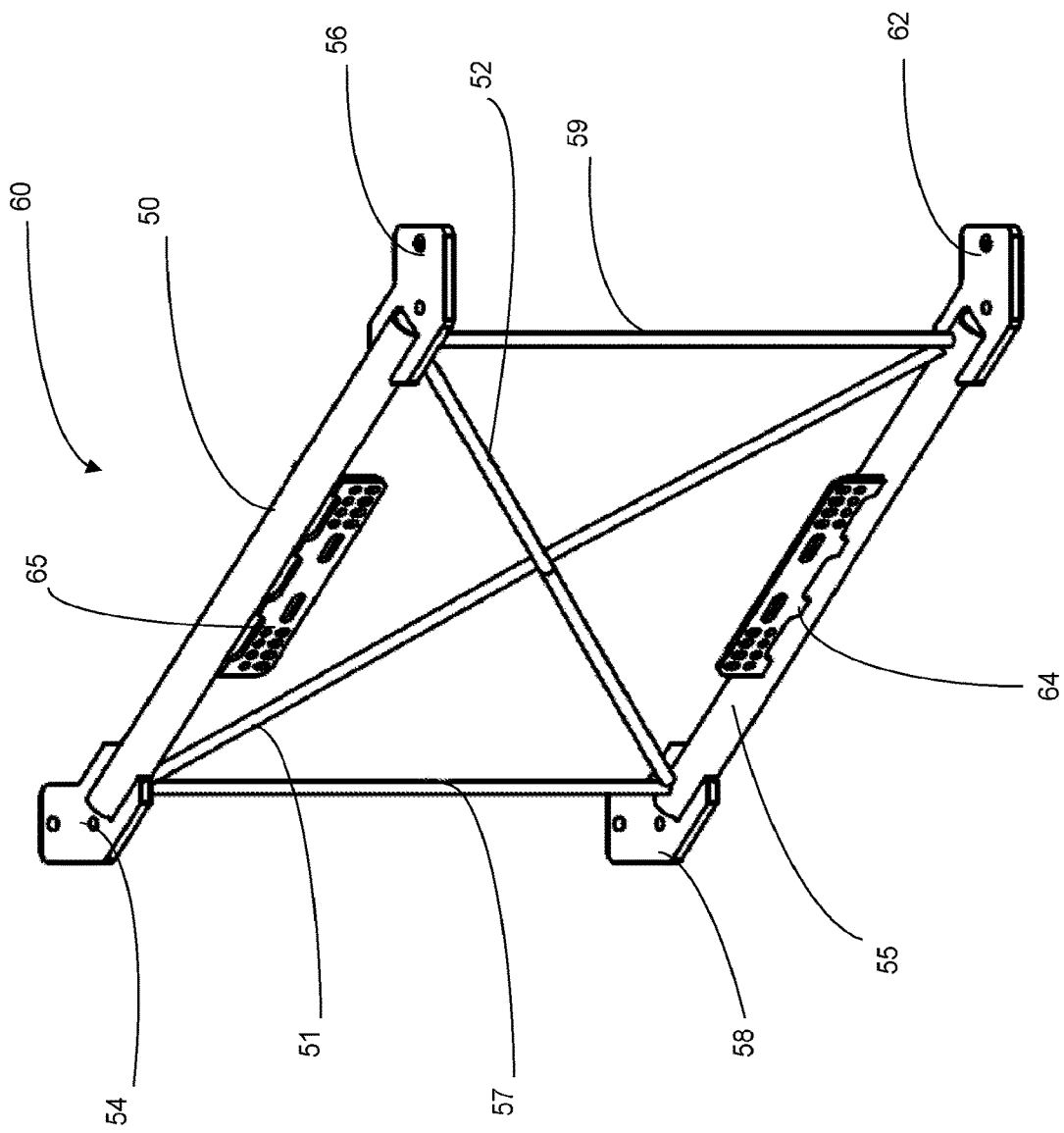
FIG. 7 illustrates a perspective view of a wall section in accordance with a preferred embodiment of the present invention.

With reference now to FIGS. 6 and 7, further aspects of the present invention shall now be further discussed. As shown in FIG. 6, a lateral spanning element 50 is shown including a lateral section 52, a first securing weldment 54, and a second securing weldment 56. According to a preferred embodiment, the lateral spanning element 50 preferably may connect by at least the first securing weldment 54 to either the straight slot weldment 42 or the multi-hole taper plate weldment 19 as discussed further below with reference to FIG. 11. Preferably, the lateral spanning element 50 may be further secured via the second securing weldment 56 to a further securing element as also further discussed herein below.

Figure 8:
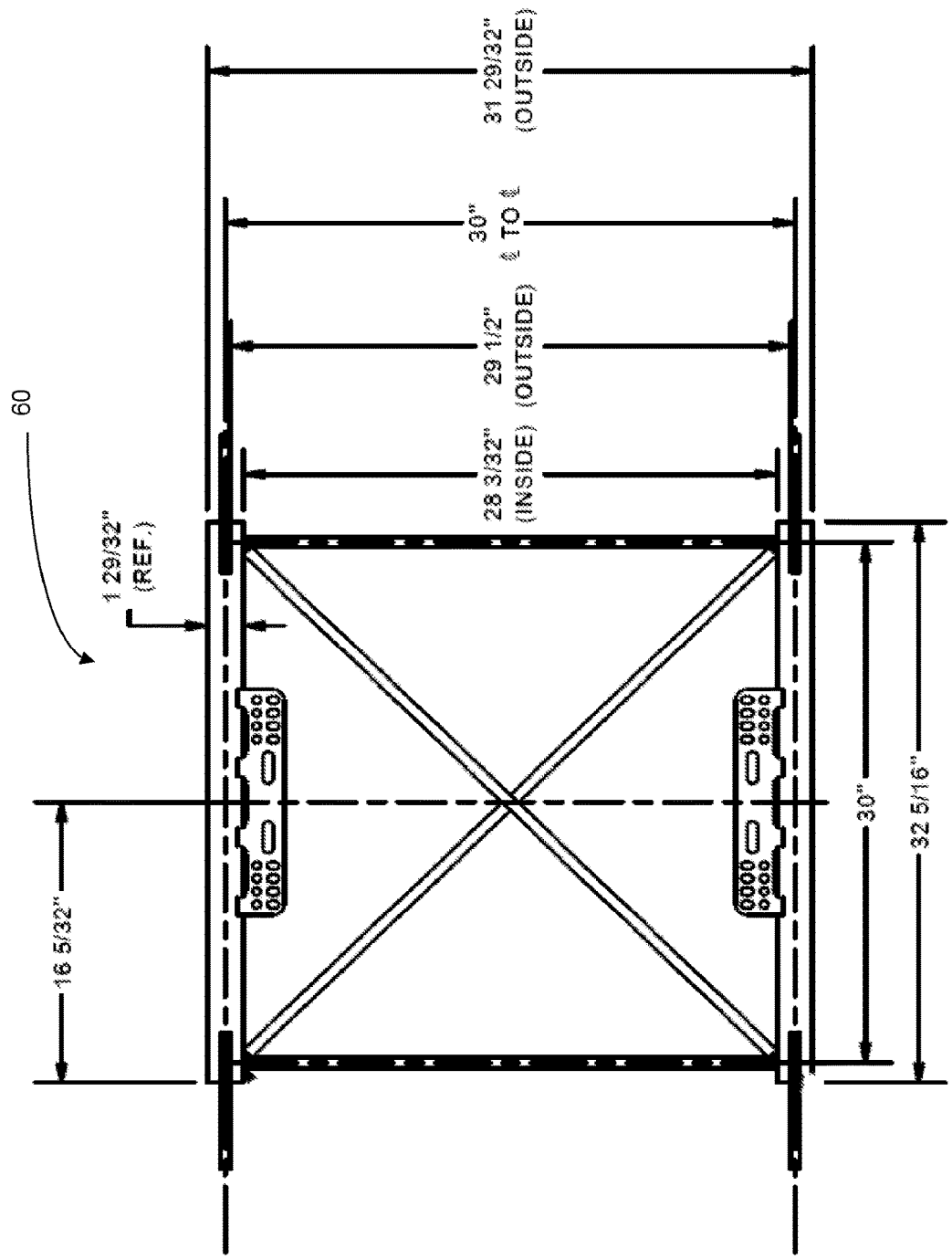
FIG. 8 illustrates a side view of the wall section illustrated in FIG. 7.

As shown in FIG. 7, lateral spanning element 50 (including first securing weldment 54 and second securing weldment 56) may preferably be incorporated into a completed wall section 60. As shown, an exemplary completed wall section 60 may preferably further include: a lower lateral spanning element 55 (including a first securing lower weldment 58 and a second securing lower weldment 62); left and right vertical supports 57, 59; cross spanning members 51, 52; an upper weldment connecting plate 65; and a lower connecting weldment plate 64. According to the present invention, the completed wall section 60 may be any of a variety of dimensions. According to an exemplary preferred embodiment, the preferred dimensions of the completed wall section 60 may conform to the dimensions illustrated in FIG. 8.

Figure 9:
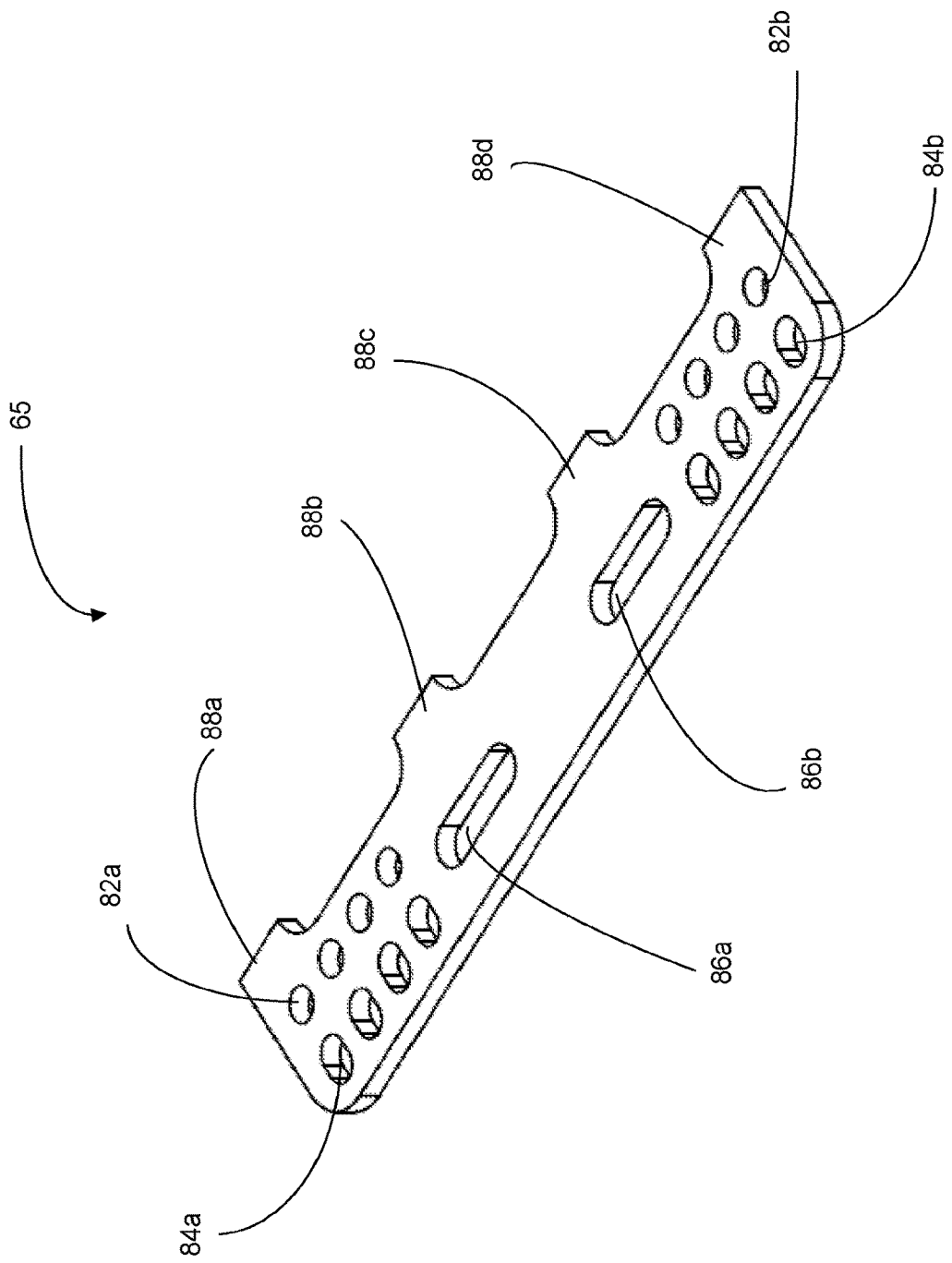
FIG. 9 is a perspective view of a connecting weldment in accordance with further preferred embodiments of the present invention.

With reference now to FIG. 9, an exemplary design and configuration for the upper and lower weldment connecting plates 64, 65 shall now be discussed. As shown in FIG. 9, an exemplary weldment connecting plate 65 may preferably include: left lower slotted holes 82*a*; right lower slotted holes 82*b*; left upper slotted holes 84*a*; right upper slotted holes 84*b*; and spacing elements 88*a*, 88*b*, 88*c*, and 88*d*. Additionally, exemplary weldment connecting plate 65 may preferably further include left and right central slotted holes 86*a* and 86*b*.

Figure 10:
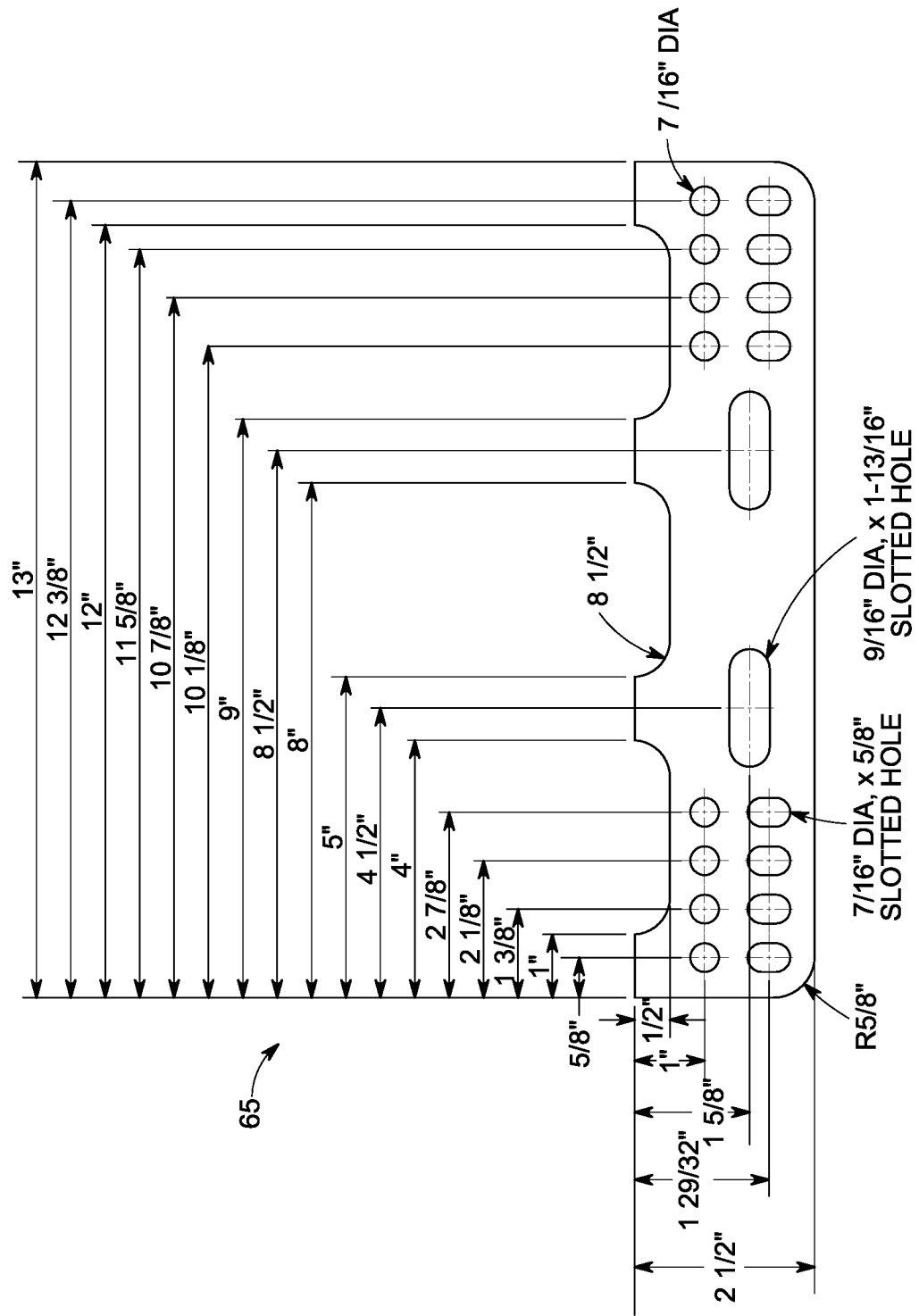
FIG. 10 illustrates a top-down view of the connecting weldment illustrated in FIG. 9.

According to the present invention, exemplary weldment connecting plates 64, 65 may be formed to any of a variety of dimensions. According to an exemplary preferred embodiment, the preferred dimensions of exemplary weldment connecting plates 64, 65 may conform to the dimensions illustrated in FIG. 10.

Figure 11:
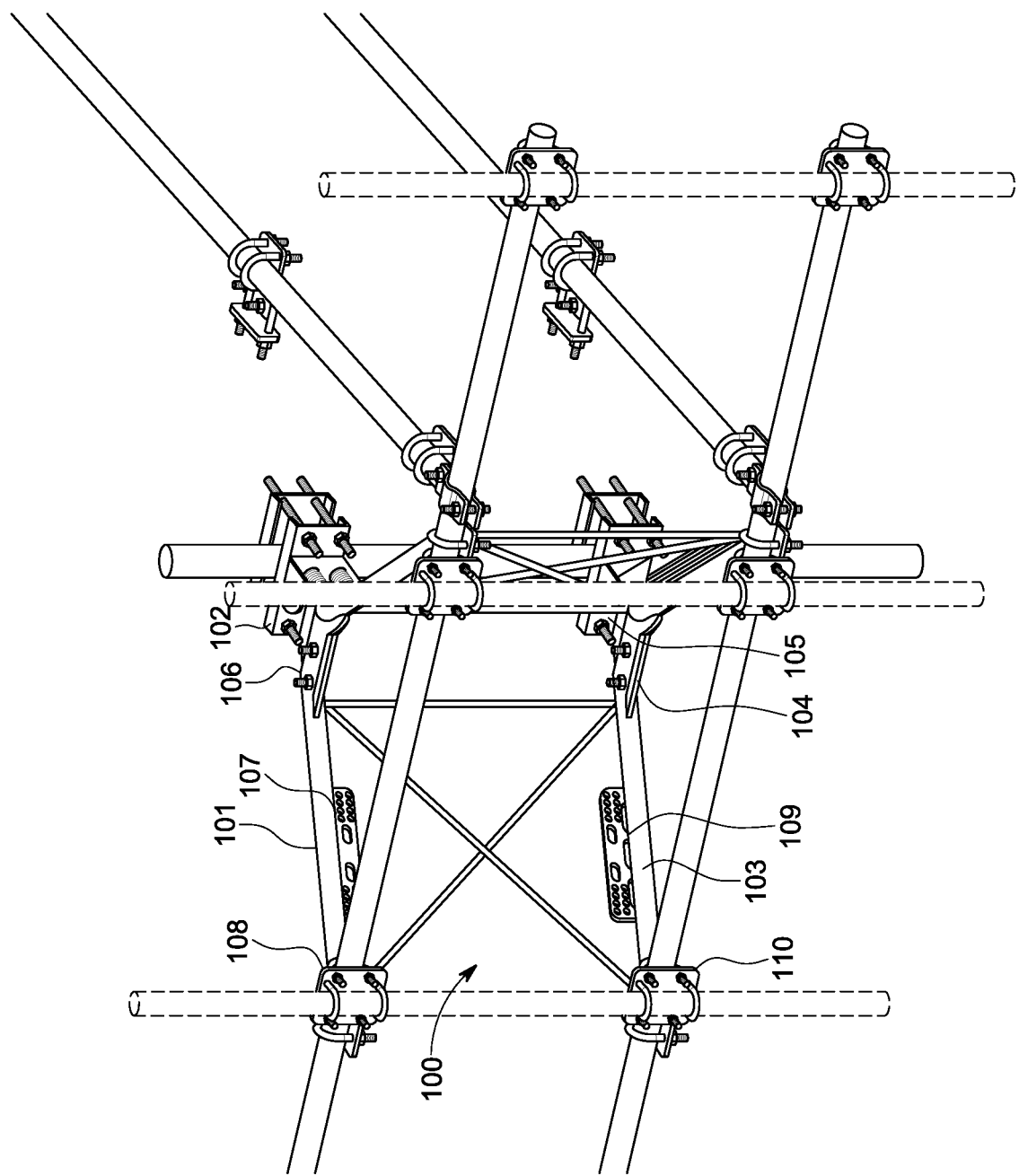
FIG. 11 illustrates a perspective view of a wall section as illustrated in FIG. 7 which is connected to the bolt calibrated angle mainstay illustrated in FIG. 1.

With reference now to FIG. 11, an exemplary completed wall section 100 in accordance with a further preferred embodiment shall now be discussed. As shown, wall section 100 is preferably connected to the straight slot weldment 42 (not shown) of upper bracket element 102 via the first securing weldment 106 of lateral spanning element 101. As further shown, a second securing weldment (not shown) of lateral spanning element 101 may preferably be further secured to an upper securing support 108. Likewise, the wall section 100 may be further secured via lower lateral spanning element 103 which as shown may preferably be connected via securing weldment 104 to the multi-hole taper plate weldment (not shown) of lower bracket element 105. As further shown, a second securing weldment (not shown) of lateral spanning element 103 may preferably be further secured to a lower securing support 110. Still further, upper and lower weldment connecting plates 107, 109 may preferably be connected to and centered on lateral spanning elements 101, 103 with the slotted holes of the weldment connecting plates 107, 109 available for lateral connections.

The above descriptions of illustrated embodiments are not intended to be exhaustive or to limit the present invention to the precise forms disclosed. Various equivalent modifications are possible within the scope of the present invention, as those skilled in the relevant art will recognize. The scope of the present invention is intended to be determined entirely by the claims.

What is claimed is:

1. A mounting system, wherein the system comprises:
   an upper bracket element, wherein the upper bracket element comprises a front plate, a back bracket and a plurality of connecting bolts;
     wherein the front plate is attached to a right front wing having a plurality of right wing slots; wherein the front plate is attached to a left front wing having a plurality of left wing slots; wherein the right and left front wings extend horizontally away from the front surface of the front plate;
   a straight slot weldment, wherein the straight slot weldment comprises a right side wall and a left side wall and an adjusting bolt guide; wherein the right and left side walls further comprise a plurality of right wall slots and left wall slots; further wherein the straight slot weldment is attached to the left front wing and the right front wing;
   a plurality of adjusting bolts, wherein at least one adjusting bolt extends through a left wing slot, one of the left wall slots, one of the right wall slots, and a right wing slot;
   a lower bracket element, wherein the lower bracket element comprises a lower backing bracket and a lower front plate; and
   a vertical wall section, wherein the vertical wall section comprises:
     at least one lateral spanning element comprising a lateral spacing element, a first securing weldment and a second securing weldment;
     vertical supports, wherein the vertical supports are substantially orthogonal to the at least one lateral spanning element; and
     a plurality of cross spanning members.

2. The system of claim 1, wherein the straight slot weldment comprises a positioning plate.

3. The system of claim 2, wherein at least a portion of the positioning plate is horizontally positioned between the left side wall and the right side wall.

4. The system of claim 3, wherein the positioning plate comprises an adjusting bolt guide.

5. The system of claim 4, wherein the at least one lateral spanning element further comprises at least one connecting weldment plate, wherein the connecting weldment plate comprises a plurality of slotted holes and spacing elements.

6. The system of claim 5, wherein the system further comprises an adjusting bolt.

7. The system of claim 6, wherein the adjusting bolt extends through the adjusting bolt guide.

8. The system of claim 7, wherein the adjusting bolt guide is configured to allow the positioning plate to move and change the distance between the straight slot weldment and the front plate.

9. An apparatus for securing a structure to a steel frame member, the apparatus comprising:
   an upper bracket assembly, wherein the upper bracket assembly comprises an upper front plate, an upper backing bracket and a plurality of upper connecting bolts; wherein the plurality of upper connecting bolts extend through the upper front plate and the upper backing bracket and are configured to secure the upper bracket assembly to a frame member inserted between the upper front plate and the upper backing bracket; wherein the upper front plate further comprises a front surface and a rear surface;

a plurality of front wing surfaces, wherein the plurality of front wing surfaces comprise a left front wing surface and a right front wing surface; wherein the left and right front wing surfaces are attached to the front surface of the front plate; wherein the left and right front wing surfaces extend orthogonally away from the front surface of the front plate a straight slot weldment, wherein the straight slot weldment is attached to the left and right front wing surfaces; wherein the straight slot weldment comprises an upper slotted surface; wherein the upper slotted surface comprises an upper supporting hole;

a lower bracket assembly, wherein the lower bracket assembly comprises a lower front plate, a lower backing bracket and a plurality of lower connecting bolts; wherein the plurality of lower connecting bolts extend through the lower front plate and the lower backing bracket and are configured to secure the lower bracket assembly to a frame member inserted between the lower front plate and the lower backing bracket; wherein the lower front plate further comprises a front surface and a rear surface; and a lower extension assembly, wherein the lower extension assembly is attached to the lower bracket assembly; wherein the lower extension assembly comprises a lower slotted surface; wherein the lower slotted surface comprises a first positioning hole and a second positioning hole; wherein the first positioning hole is a first distance from the lower front plate; wherein the second positioning hole is at a second distance from the lower front plate; wherein the first distance is greater than the second distance.

\* \* \* \* \*